United States Patent
Gustafsson et al.

(10) Patent No.: US 9,643,604 B2
(45) Date of Patent: May 9, 2017

(54) DRIVER ASSIST ARRANGEMENT

(71) Applicant: VOLVO CAR CORPORATION, Gothenburg (SE)

(72) Inventors: Tony Gustafsson, Askim (SE); Mats Jonasson, Partille (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/659,965

(22) Filed: Mar. 17, 2015

(65) Prior Publication Data
US 2015/0266474 A1 Sep. 24, 2015

(30) Foreign Application Priority Data

Mar. 24, 2014 (EP) .................................. 14161254

(51) Int. Cl.
*B60W 30/09* (2012.01)
*B60T 8/1755* (2006.01)
(Continued)

(52) U.S. Cl.
CPC ............ *B60W 30/09* (2013.01); *B60T 7/042* (2013.01); *B60T 7/22* (2013.01); *B60T 8/17558* (2013.01);
(Continued)

(58) Field of Classification Search
CPC ... B60T 8/17558; B60W 30/09; B60W 30/08; B62D 15/0265; B62D 6/003; B62D 15/025
See application file for complete search history.

(56) References Cited

U.S. PATENT DOCUMENTS

2010/0003426 A1* 1/2010 Suzuki .................... C08F 20/30
428/1.31
2010/0030426 A1* 2/2010 Okita ........................ B60T 7/22
701/41
(Continued)

FOREIGN PATENT DOCUMENTS

DE 102006042666 3/2008
DE 102008040241 1/2010
(Continued)

OTHER PUBLICATIONS

Extended European Search Report for European Application No. 14161254.9, Completed by the European Patent Office, Dated Sep. 22, 2014, 9 Pages.
(Continued)

*Primary Examiner* — Dale Moyer
(74) *Attorney, Agent, or Firm* — Brooks Kushman P.C.

(57) ABSTRACT

A driver assist arrangement includes a first yaw rate controller, a hazard evaluation unit, a driver intention evaluation unit, and a second yaw rate controller. The first yaw rate controller is configured to control a yaw rate of a vehicle hosting the arrangement by comparing an expected yaw rate with an actual yaw rate, and in response thereto selectively apply brakes of respective wheels of the host vehicle. The second yaw rate controller is configured to intervene in the control of the first yaw rate controller in case the evaluated risk of an accident is above a threshold value and occurrence of an avoidance maneuver initiated by the driver is detected. A vehicle including a driver assist arrangement and a method of assisting a driver of a vehicle are also provided.

11 Claims, 2 Drawing Sheets

(51) Int. Cl.
   *B60T 7/22* (2006.01)
   *B62D 15/02* (2006.01)
   *B60W 10/18* (2012.01)
   *B60W 10/20* (2006.01)
   *B60T 7/04* (2006.01)

(52) U.S. Cl.
   CPC ............ *B60W 10/18* (2013.01); *B60W 10/20* (2013.01); *B62D 15/0265* (2013.01); *B60T 2201/022* (2013.01); *B60T 2260/02* (2013.01); *B60W 2510/18* (2013.01); *B60W 2510/20* (2013.01); *B60W 2520/14* (2013.01); *B60W 2710/18* (2013.01); *B60W 2710/20* (2013.01); *B60W 2720/14* (2013.01)

(56) References Cited

U.S. PATENT DOCUMENTS

| 2011/0276227 | A1 | 11/2011 | Sugawara et al. |
| 2012/0226423 | A1 | 9/2012 | Sekiguchi |
| 2013/0030651 | A1 | 1/2013 | Moshchuk et al. |
| 2013/0166151 | A9 | 6/2013 | Stabrey |
| 2015/0353079 | A1* | 12/2015 | Suzuki ............ B60T 8/1755 701/43 |

FOREIGN PATENT DOCUMENTS

| EP | 1927499 | 6/2008 |
| EP | 2141057 | 1/2010 |
| WO | 2008020290 A1 | 2/2008 |

OTHER PUBLICATIONS

Extended European Search Report for European Application No. 14161254.9, completed by the European Patent Office, dated Jun. 30, 2016, 7 pages.

* cited by examiner

DRIVER ASSIST ARRANGEMENT

CROSS-REFERENCE TO RELATED APPLICATIONS

This application claims foreign priority benefits under 35 U.S.C. §119(a)-(d) to European Patent Application No. EP 14161254.9, filed Mar. 24, 2014, which is incorporated by reference in its entirety.

TECHNICAL FIELD

The present disclosure relates to a driver assist arrangement. The present disclosure also relates to a vehicle comprising a driver assist arrangement and a method of assisting a driver.

BACKGROUND

In recent years both passive and active safety improving systems and arrangements have been developed in the automotive industry. Active safety systems are systems capable of improving the safety of driving while passive safety systems are systems capable of improving occupant safety during a collision. Notwithstanding the fact that such development of safety systems and arrangements has taken place, vehicle accidents are still a major concern worldwide. In terms of overall occupant safety, both active safety systems and passive safety systems are important. However, today's active safety systems have a considerable potential for improvement, and it is a greater advantage if an accident can be avoided by an active safety system than if damages incurred by an accident are alleviated by a passive safety system.

Several problems arise when designing active safety arrangements. One such problem is that if an active safety arrangement is designed to autonomously avoid an accident, the driver will feel that he or she is out of control of the vehicle during such autonomous accident avoidance. Further, a system intervening to such an extent may raise further safety concerns, since such a system has to rely on input data from different sensors which may give erroneous information that can lead to an erroneous interpretation of a driving situation.

Accordingly, in view of the above, there is a need for an improved driver assist arrangement capable of assisting a driver of a vehicle in potentially hazardous driving situations.

SUMMARY

An object of some exemplary embodiments of the present disclosure is to provide an improved driver assist arrangement.

According to an exemplary embodiment of the disclosure, the object is achieved by a driver assist arrangement configured to assist a driver of a vehicle hosting the arrangement in potentially hazardous driving situations, the arrangement comprising;
 a first yaw rate controller, configured to control a yaw rate of the hosting vehicle by comparing an expected yaw rate with an actual yaw rate and in response thereto selectively apply brakes of respective wheels of the host vehicle,
 a hazard evaluation unit, configured to detect an obstacle in a driving environment of the host vehicle and to evaluate a risk of an accident between the host vehicle and the detected obstacle, and
 a driver intention evaluation unit, configured to detect occurrence of an avoidance maneuver initiated by the driver,
 where the arrangement further comprises a second yaw rate controller, configured to intervene in the control of the first yaw rate controller in case;
 the evaluated risk of an accident is above a threshold value, and
 occurrence of an avoidance maneuver initiated by the driver is detected.

Since the second yaw rate controller is configured to intervene in the control of the first yaw rate controller in potentially hazardous situations, i.e. in case the evaluated risk of an accident is above a threshold value and occurrence of an avoidance maneuver initiated by the driver is detected, the arrangement allows for a different control of yaw rate of the host vehicle in case a hazardous situation and an avoidance maneuver initiated by the driver is detected. Further, a quicker control of the yaw rate can be allowed since the second yaw rate controller can control yaw rate of the host vehicle without having to compare an expected yaw rate with an actual yaw rate and control the yaw rate in response thereto. As a further result, higher lateral acceleration of the host vehicle in the potentially hazardous situation can be achieved, since the arrangement allows for a different control of yaw rate and since the second yaw rate controller is configured to intervene in the control of the relatively slow first yaw rate controller.

Accordingly, in view of the prior art driver assist arrangements, an improved driver assist arrangement is provided. As a result, the above mentioned object is achieved.

Also, a driver assist arrangement is provided which improves overall host vehicle safety, since the risk of an accident between the host vehicle and an obstacle is reduced due to the quicker control of the yaw rate and the higher lateral acceleration of the host vehicle.

Further, since the second yaw rate controller is configured to intervene in the control of the first yaw rate controller only in case occurrence of an avoidance maneuver initiated by the driver is detected, a driver assist arrangement is provided where a driver will feel that he or she is in control of the vehicle during such an avoidance maneuver.

According to some exemplary embodiments, the second yaw rate controller is configured to intervene through at least one of a selective application of brakes of respective wheels of the host vehicle and an active steering of steered wheels of the host vehicle. Since the second yaw rate controller is configured to intervene through at least one of a selective application of brakes of the respective wheels of the host vehicle and an active steering of steered wheels of the host vehicle, an even quicker control of the yaw rate and a higher lateral acceleration of the host vehicle can be achieved.

According to some exemplary embodiments, the driver intention evaluation unit is further configured to detect a direction of a detected avoidance maneuver and where the second yaw rate controller is configured to intervene through a control operation designed to cause a decrease in a radius of curvature of a trajectory of the host vehicle in the direction of the detected avoidance maneuver. Since the second yaw rate controller is configured to intervene through a control operation designed to cause a decrease in a radius of curvature of a trajectory of the host vehicle in the direction of the detected avoidance maneuver, an even higher lateral acceleration of the host vehicle can be achieved. Also, overall occupant safety is improved since the decreased radius of curvature of the trajectory will increase the chances of avoiding a collision.

According to some exemplary embodiments, the second yaw rate controller is configured to intervene through a cancellation of the control of the first yaw rate controller. Since the second yaw rate controller is configured to intervene through a cancellation of the control of the first yaw rate controller, an even quicker control of the yaw rate and a higher lateral acceleration of the host vehicle can be achieved.

According to some exemplary embodiments, the second yaw rate controller is configured to intervene in the control of the first yaw rate controller to allow a higher level of over-steer of the host vehicle than normally allowed by the first yaw rate controller. Since the second yaw rate controller is configured to intervene in the control of the first yaw rate controller to allow a higher level of over-steer of the host vehicle than normally allowed by the first yaw rate controller, a higher lateral acceleration of the host vehicle can be achieved. Thereby, an arrangement is provided improving the chances of avoiding an impact. As a result, overall occupant safety is improved.

Further exemplary embodiments herein aim to provide a vehicle comprising an arrangement according to any one of the claims. Since the vehicle comprises an arrangement according to some exemplary embodiments, a vehicle is provided comprising an improved driver assist arrangement.

Again, as a result, the above mentioned object is achieved

Further exemplary embodiments herein aim to provide a method of assisting a driver of a vehicle in potentially hazardous driving situations, using an arrangement comprising a first yaw rate controller, a hazard evaluation unit, and a driver intention evaluation unit, and a second yaw rate controller, the method comprising;

controlling a yaw rate of the hosting vehicle by comparing an expected yaw rate with an actual yaw rate and in response thereto selectively apply brakes of respective wheels of the host vehicle, using the first yaw rate controller, and detecting an obstacle in a driving environment of the host vehicle, and evaluating a risk of an accident between the host vehicle and the detected obstacle, using the hazard evaluation unit, and detecting occurrence of an avoidance maneuver initiated by the driver, using the driver intention evaluation unit, and where the method further comprises;

intervening in the control of the first yaw rate controller, using the second yaw rate controller, in case;

the evaluated risk of an accident is above a threshold value, and occurrence of an avoidance maneuver initiated by the driver is detected.

Since the method comprises the step of intervening in the control of the first yaw rate controller, using the second yaw rate controller, in a potentially hazardous situation, i.e. in case the evaluated risk of an accident is above a threshold value, and occurrence of an avoidance maneuver initiated by the driver is detected, the method allows for a different control of yaw rate of the host vehicle in case a hazardous situation and an avoidance maneuver initiated by the driver is detected. Further, a quicker control of the yaw rate can be allowed since the second yaw rate controller can control yaw rate of the host vehicle without having to compare an expected yaw rate with an actual yaw rate and in response thereto control the yaw rate. As a further result, higher lateral acceleration of the host vehicle, in the potentially hazardous situation, can be achieved since the method allows for a different control of yaw rate and since the method comprises the step of intervening in the control of the relatively slow first yaw rate controller.

Accordingly, in view of the prior art methods of assisting a driver of a vehicle, an improved method is provided. As a result, the above mentioned object is achieved.

Also, a method of assisting a driver of a vehicle driver is provided which improves overall host vehicle safety, since the risk of an accident between the host vehicle and an obstacle is reduced due to the quicker control of the yaw rate and the higher lateral acceleration of the host vehicle.

Further, since the method is configured to perform the step of intervening in the control of the first yaw rate controller, only in case occurrence of an avoidance maneuver initiated by the driver is detected, a method of assisting a driver of a vehicle is provided where a driver will feel that he or she is in control of the vehicle during such an avoidance maneuver.

According to some exemplary embodiments, the method further comprises;

intervening through at least one of a selective application of brakes of respective wheels of the host vehicle and an active steering of steered wheels of the host vehicle, using the second yaw rate controller.

Since the method, according to such exemplary embodiments, comprises the step of intervening through at least one of a selective application of the brakes of respective wheels of the host vehicle and an active steering of steered wheels of the host vehicle, using the second yaw rate controller, an even quicker control of the yaw rate and a higher lateral acceleration of the host vehicle can be achieved.

According to some exemplary embodiments, the method further comprises;

detecting a direction of a detected avoidance maneuver, using the driver intention evaluation unit, and intervening through a control operation designed to cause a decrease in a radius of curvature of a trajectory of the host vehicle in the direction of the detected avoidance maneuver, using the second yaw rate controller.

Since the method, according to such exemplary embodiments, comprises the step of intervening through a control operation designed to cause a decrease in a radius of curvature of a trajectory of the host vehicle in the direction of the detected avoidance maneuver, using the second yaw rate controller, an even higher lateral acceleration of the host vehicle can be achieved. Also, the method improves the overall occupant safety, since the decreased radius of curvature of the trajectory will increase the chance of avoiding a collision.

According to some exemplary embodiments, the method further comprises;

intervening through a cancellation of the control of the first yaw rate controller, using the second yaw rate controller.

Since the method, according to such exemplary embodiments, comprises the step of intervening through a cancellation of the control of the first yaw rate controller, using the second yaw rate controller, an even quicker control of the yaw rate and a higher lateral acceleration of the host vehicle can be achieved.

According to some exemplary embodiments, the method further comprises;

intervening in the control of the first yaw rate controller, using the second yaw rate controller, to allow a higher level of over-steer of the host vehicle than normally allowed by the first yaw rate controller.

Since the method, according to such exemplary embodiments, comprises the step of intervening in the control of the first yaw rate controller, using the second yaw rate controller, to allow a higher level of over-steer of the host vehicle than normally allowed by the first yaw rate controller, an even higher lateral acceleration of the host vehicle can be achieved. Thereby, a method is provided improving the chance of avoiding an impact. As a result, overall occupant safety is improved.

Further features of, and advantages with, the present disclosure will become apparent when studying the appended claims and the following detailed description. Those skilled in the art will realize that the different features described may be combined to create embodiments other than those described in the following, without departing from the scope of the present disclosure, as defined by the appended claims.

BRIEF DESCRIPTION OF THE DRAWINGS

Various aspects of the disclosure, including its particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Embodiments herein will now be described more fully with reference to the accompanying drawings, in which example embodiments are shown. Disclosed features of example embodiments may be combined as readily understood by one of ordinary skill in the art. Like numbers refer to like elements throughout. Well-known functions or constructions will not necessarily be described in detail for brevity and/or clarity.

Figure 1:
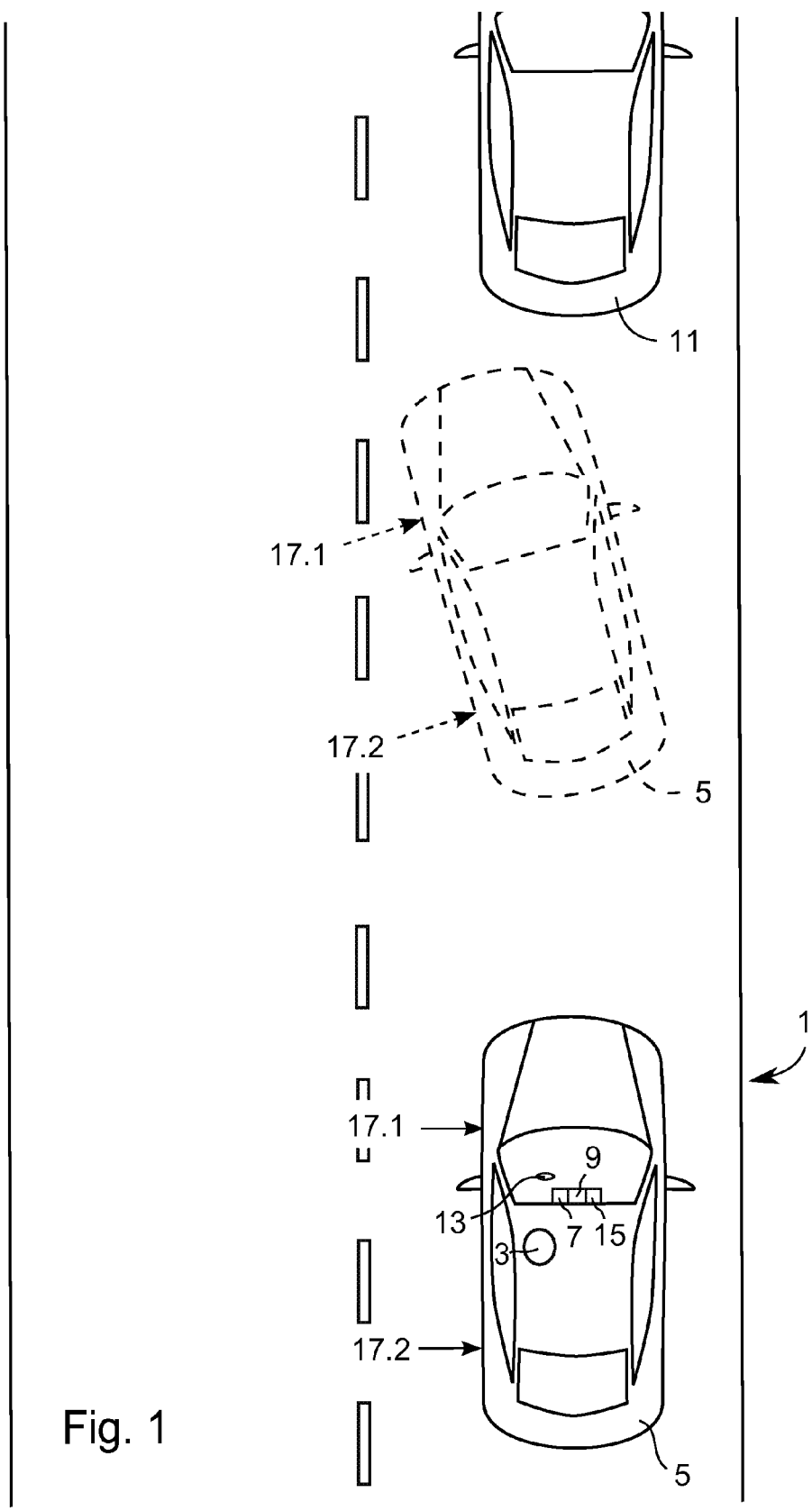
FIG. 1 illustrates a vehicle comprising a driver assist arrangement according to some exemplary embodiments herein.

FIG. 1 illustrates a vehicle 5 comprising a driver assist arrangement 1 configured to assist a driver 3 of the vehicle 5 hosting the arrangement 1 in potentially hazardous driving situations. The arrangement 1 comprises first yaw rate controller 7 configured to control a yaw rate of the hosting vehicle 5 by comparing an expected yaw rate with an actual yaw rate, and in response thereto selectively apply brakes of respective wheels of the host vehicle 5. The first yaw rate controller 7 may form part of an electronic stability control (ESC) system or dynamic stability control (DSC) system, or similar, being designed such that braking is applied to an outer front wheel to counter over-steer or to an inner rear wheel to counter under-steer. The first yaw rate controller 7 comprises a yaw rate sensor configured to measure an actual yaw rate and a processing unit configured to compare an expected yaw rate with an actual yaw rate. The expected yaw rate is a yaw rate expected when taking into account input values such as steering wheel angle and vehicle velocity.

The driver assist arrangement 1 further comprises a hazard evaluation unit 9, configured to detect an obstacle 11 in a driving environment of the host vehicle 5, and to evaluate a risk of an accident between the host vehicle 5 and the detected obstacle 11. The hazard evaluation unit 9 may comprise one or more sensors such as RADAR (RAdio Detection And Ranging) sensors or LASER (Light Amplification by Stimulated Emission of Radiation) sensors, or LIDAR (LIght Detection And Ranging) sensors, or one or more imaging units, configured to detect an obstacle 11 in a driving environment of the host vehicle 5. As an alternative, or in combination, the hazard evaluation unit 9 may comprise a positioning unit and an electronic map where the positioning unit may comprise a space based satellite navigation system such as a Global Positioning System (GPS), The Russian GLObal NAvigation Satellite System (GLONASS), European Union Galileo positioning system, Chinese Compass navigation system, or Indian Regional Navigational Satellite System. The obstacle 11 referred to may be another vehicle, as illustrated in FIG. 1, or may be a pedestrian, an animal, a sharp curve or any other obstacle which may pose a danger to the safety of driving. As mentioned above, the hazard evaluation unit 9 is configured to evaluate a risk of an accident between the host vehicle 5 and the detected obstacle 11. Such an evaluation may be performed through the hazard evaluation unit 9 being configured to compare a relative velocity between the host vehicle 5 and the obstacle 11 with a distance from the host vehicle 5 to the obstacle 11.

The driver assist arrangement 1 further comprises a driver intention evaluation unit 13, configured to detect occurrence of an avoidance maneuver initiated by the driver 3. The driver intention evaluation unit 13 may comprise a steering angle sensor, where the detection of occurrence of an avoidance maneuver initiated by the driver 3 constitutes a change in steering angle having a certain magnitude or a certain rate of change.

The driver assist arrangement 1 further comprises a second yaw rate controller 15, configured to intervene in the control of the first yaw rate controller 7 in case;
 the evaluated risk of an accident is above a threshold value, and
 occurrence of an avoidance maneuver initiated by the driver 3 is detected.

According to some exemplary embodiments, the second yaw rate controller 15, which may be similarly comprised to the first yaw rate controller 7, is configured to intervene through at least one of a selective application of brakes of respective wheels 17.1, 17.2 of the host vehicle 5 and an active steering of steered wheels 17.1 of the host vehicle 5. Thereby, an even quicker control of the yaw rate and a higher lateral acceleration of the host vehicle 5 can be achieved. Initially, in a hazardous driving situation, a vehicle driver 3 usually steers too little. Thereby, when the vehicles 5 turns-in, the cornering curvature is initially too large, which in turn provides insufficient lateral acceleration to avoid an impact. Accordingly, due to the second yaw rate controller 15 being configured to intervene through at least one of a selective application of brakes of respective wheels 17.1, 17.2 of the host vehicle 5 and an active steering of steered wheels 17.1 of the host vehicle 5, the chance of avoiding an impact is improved.

The driver intention evaluation unit 13 may be further configured to detect a direction of a detected avoidance maneuver, and the second yaw rate controller 15 configured to intervene through a control operation designed to cause a decrease in a radius of curvature of a trajectory of the host vehicle 5 in the direction of the detected avoidance maneuver. Such a control operation may involve selective application of brakes of respective wheels 17.1, 17.2 of the host vehicle 5 and an active steering of steered wheels 17.1 of the host vehicle 5, designed to cause a decrease in a radius of curvature of a trajectory of the host vehicle in the direction of the detected avoidance maneuver.

The second yaw rate controller 15 will, in some exemplary embodiments, be configured to intervene through a cancellation of the control of the first yaw rate controller 7. The first yaw rate controller 7 is normally configured to control a yaw rate of the hosting vehicle 5, by comparing an expected yaw rate with an actual yaw rate, and in response thereto selectively apply brakes of respective wheels of the host vehicle 5. The first yaw rate controller is then configured to selectively apply brakes of respective wheels of the host vehicle 5 in a manner such that under-steer and over-steer is countered. Such selective application of brakes may have a negative impact on the cornering capability of the host vehicle 5. Thus, in embodiments where the second yaw rate controller 15 is configured to intervene through a cancellation of the control of the first yaw rate controller 7, a higher lateral acceleration of the host vehicle 5 can be achieved during an avoidance maneuver.

The second yaw rate controller 15 will, in some exemplary embodiments, be configured to intervene in the control of the first yaw rate controller 7, to allow a higher level of over-steer of the host vehicle 5 than normally allowed by the first yaw rate controller 7. By allowance of a higher level of over-steer of the host vehicle 5 than normally allowed by the first yaw rate controller 7, the radius of curvature of a trajectory of the host vehicle 5 can be reduced. Moreover, a higher lateral acceleration of the host vehicle 5 can be achieved during an avoidance maneuver. Thereby, an arrangement 1 is provided which reduces the risk of an accident between the hosting vehicle 5 and an obstacle 11.

FIG. 1 also illustrates a vehicle 5 comprising an arrangement 1 according to some exemplary embodiments. The vehicle 5 is also illustrated in broken lines further down the road in FIG. 1. Given a certain relative velocity between the hosting vehicle 5 and an object 11, there is a distance after which it is not possible to avoid a collision only by braking. However, when the distance between the hosting vehicle 5 and an object 11 is smaller than this distance, it may be possible to avoid a collision by steering within a second distance interval. The vehicle 5 illustrated in broken lines in FIG. 1, may be assumed to be in this second distance interval. Also, assuming that the driver tries to avoid an impact, a vehicle without the driver assist arrangement 1 would at this point under-steer and exhibit large front side-slip angles. By the second yaw rate controller 15 intervening in the control of the first yaw rate controller 7, such under-steer and large front side-slip angles can be avoided. For example, the second yaw rate controller 15 can intervene through a selective application of brakes of respective wheels 17.1, 17.2 of the host vehicle 5, to force the host vehicle 5 into an over-steer to reduce a radius of curvature of a trajectory of the host vehicle 5. Thereby, the host vehicle 5 will have a greater chance of avoiding an accident.

The second yaw rate controller 15 will, in some exemplary embodiments, be configured to intervene in the control of the first yaw rate controller 7, with a magnitude which is dependent upon a level of the evaluated risk of accident. That is, in case of the risk of an accident being evaluated as high, the second yaw rate controller 15 will intervene with a higher magnitude than in case the risk of an accident is evaluated as lower.

Figure 2:
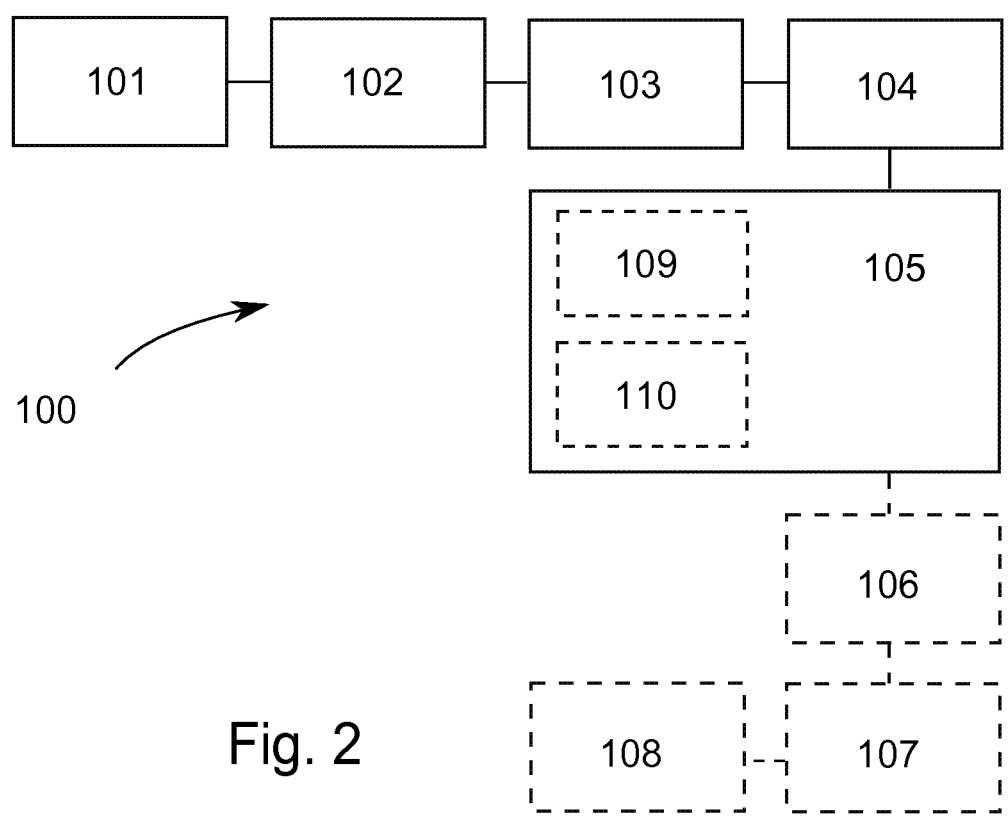
FIG. 2 illustrates method of assisting a vehicle driver according to some exemplary embodiments herein.

FIG. 2 illustrates a method 100 of assisting a driver of a vehicle in potentially hazardous driving situations, using an arrangement comprising a first yaw rate controller, a hazard evaluation unit, and a driver intention evaluation unit, and a second yaw rate controller, the method 100 comprising;

controlling 101 a yaw rate of the hosting vehicle by comparing an expected yaw rate with an actual yaw rate and in response thereto selectively apply brakes of respective wheels of the host vehicle, using the first yaw rate controller, and detecting 102 an obstacle in a driving environment of the host vehicle, and evaluating 103 a risk of an accident between the host vehicle and the detected obstacle, using the hazard evaluation unit, and detecting 104 occurrence of an avoidance maneuver initiated by the driver, using the driver intention evaluation unit, and where the method 100 further comprises;

intervening 105 in the control of the first yaw rate controller, using the second yaw rate controller, in case;
the evaluated risk of an accident is above a threshold value, and occurrence of an avoidance maneuver initiated by the driver is detected.

As illustrated in FIG. 2, the method 100 may further comprise;

intervening 106 through at least one of a selective application of brakes of respective wheels of the host vehicle and an active steering of steered wheels of the host vehicle, using the second yaw rate controller.

As illustrated in FIG. 2, the method 100 may further comprise;

detecting a direction of a detected avoidance maneuver, using the driver intention evaluation unit, and intervening 108 through a control operation designed to cause a decrease in a radius of curvature of a trajectory of the host vehicle in the direction of the detected avoidance maneuver, using the second yaw rate controller.

As illustrated in FIG. 2, the method 100 may further comprise;

intervening 109 through a cancellation of the control of the first yaw rate controller, using the second yaw rate controller.

As illustrated in FIG. 2, the method 100 may further comprise;

intervening 110 in the control of the first yaw rate controller, using the second yaw rate controller, to allow a higher level of over-steer of the host vehicle than normally allowed by the first yaw rate controller.

Although various aspects have been described with reference to example embodiments, many different alterations, modifications and the like will become apparent for those skilled in the art. While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A driver assist arrangement configured to assist a driver of a vehicle hosting the arrangement in potentially hazardous driving situations, the arrangement comprising:
    a first yaw rate controller configured to control a yaw rate of the hosting vehicle by comparing an expected yaw rate with an actual yaw rate and in response thereto selectively apply brakes of respective wheels of the host vehicle;
    a hazard evaluation unit configured to detect an obstacle in a driving environment of the host vehicle and to evaluate a risk of an accident between the host vehicle and the detected obstacle;
    a driver intention evaluation unit configured to detect occurrence of an avoidance maneuver initiated by the driver; and
    a second yaw rate controller configured to intervene in the control of the first yaw rate controller if the evaluated risk of an accident is above a threshold value and occurrence of an avoidance maneuver initiated by the driver is detected, wherein the second yaw rate controller is configured to intervene in the control of the first yaw rate controller to allow a higher level of over-steer of the host vehicle than normally allowed by the first yaw rate controller.

2. The arrangement of claim 1 wherein the second yaw rate controller is configured to intervene through at least one of a selective application of brakes of respective wheels of the host vehicle and an active steering of steered wheels of the host vehicle.

3. The arrangement of claim 2 wherein the driver intention evaluation unit is further configured to detect a direction of a detected avoidance maneuver and where the second yaw rate controller is configured to intervene through a control operation designed to cause a decrease in a radius of curvature of a trajectory of the host vehicle in the direction of the detected avoidance maneuver.

4. The arrangement of claim 1 wherein the second yaw rate controller is configured to intervene through a cancellation of the control of the first yaw rate controller.

5. A vehicle comprising an arrangement according to claim 1.

6. A method of assisting a driver of a vehicle in potentially hazardous driving situations, using an arrangement comprising a first yaw rate controller, a hazard evaluation unit, a driver intention evaluation unit, and a second yaw rate controller, the method comprising:
    controlling a yaw rate of the hosting vehicle by comparing an expected yaw rate with an actual yaw rate and in response thereto selectively apply brakes of respective wheels of the host vehicle, using the first yaw rate controller;
    detecting an obstacle in a driving environment of the host;
    evaluating a risk of an accident between the host vehicle and the detected obstacle, using the hazard evaluation unit;
    detecting occurrence of an avoidance maneuver initiated by the driver, using the driver intention evaluation unit; and
    intervening in the control of the first yaw rate controller, using the second yaw rate controller, if the evaluated risk of an accident is above a threshold value and occurrence of an avoidance maneuver initiated by the driver is detected, the intervening in the control of the first yaw rate controller, using the second yaw rate controller, to allow a higher level of over-steer of the host vehicle than normally allowed by the first yaw rate controller.

7. The method of claim 6 further comprising intervening through at least one of a selective application of brakes of respective wheels of the host vehicle and an active steering of steered wheels of the host vehicle, using the second yaw rate controller.

8. The method of claim 7 further comprising:
    detecting a direction of a detected avoidance maneuver, using the driver intention evaluation unit; and
    intervening through a control operation designed to cause a decrease in a radius of curvature of a trajectory of the host vehicle in the direction of the detected avoidance maneuver, using the second yaw rate controller.

9. The method of claim 6 further comprising intervening through a cancellation of the control of the first yaw rate controller, using the second yaw rate controller.

10. A driver assist arrangement configured to assist a driver of a vehicle hosting the arrangement in potentially hazardous driving situations, the arrangement comprising:
    a first yaw rate controller configured to control a yaw rate of the hosting vehicle by comparing an expected yaw rate with an actual yaw rate and in response thereto selectively apply brakes of respective wheels of the host vehicle;
    a hazard evaluation unit configured to detect an obstacle in a driving environment of the host vehicle and to evaluate a risk of an accident between the host vehicle and the detected obstacle;
    a driver intention evaluation unit configured to detect occurrence of an avoidance maneuver initiated by the driver; and
    a second yaw rate controller configured to intervene in the control of the first yaw rate controller if the evaluated risk of an accident is above a threshold value and occurrence of an avoidance maneuver initiated by the driver is detected;
    wherein the second yaw rate controller is configured to intervene through at least one of a selective application of brakes of respective wheels of the host vehicle and an active steering of steered wheels of the host vehicle;
    wherein the driver intention evaluation unit is further configured to detect a direction of a detected avoidance maneuver and where the second yaw rate controller is configured to intervene through a control operation designed to cause a decrease in a radius of curvature of a trajectory of the host vehicle in the direction of the detected avoidance maneuver.

11. A method of assisting a driver of a vehicle in potentially hazardous driving situations, using an arrangement comprising a first yaw rate controller, a hazard evaluation unit, a driver intention evaluation unit, and a second yaw rate controller, the method comprising:
    controlling a yaw rate of the hosting vehicle by comparing an expected yaw rate with an actual yaw rate and in response thereto selectively apply brakes of respective wheels of the host vehicle, using the first yaw rate controller;
    detecting an obstacle in a driving environment of the host;
    evaluating a risk of an accident between the host vehicle and the detected obstacle, using the hazard evaluation unit;
    detecting occurrence of an avoidance maneuver initiated by the driver, using the driver intention evaluation unit;
    intervening in the control of the first yaw rate controller, using the second yaw rate controller, if the evaluated risk of an accident is above a threshold value and occurrence of an avoidance maneuver initiated by the driver is detected;

intervening through at least one of a selective application of brakes of respective wheels of the host vehicle and an active steering of steered wheels of the host vehicle, using the second yaw rate controller;

detecting a direction of a detected avoidance maneuver, using the driver intention evaluation unit; and intervening through a control operation designed to cause a decrease in a radius of curvature of a trajectory of the host vehicle in the direction of the detected avoidance maneuver, using the second yaw rate controller.

* * * * *